United States Patent
Rai et al.

(10) Patent No.: US 9,264,566 B1
(45) Date of Patent: Feb. 16, 2016

(54) PRINT JOB PRODUCTION METHODS AND SYSTEMS IN A LARGE TRANSACTION PRINT ENVIRONMENT

(71) Applicant: Xerox Corporation, Norwalk, CT (US)

(72) Inventors: Sudhendu Rai, Fairport, NY (US); Eric Michael Gross, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/549,683

(22) Filed: Nov. 21, 2014

(51) Int. Cl.
*G06F 3/12* (2006.01)
*H04N 1/00* (2006.01)

(52) U.S. Cl.
CPC .......... *H04N 1/00954* (2013.01); *H04N 1/001* (2013.01); *H04N 1/00957* (2013.01)

(58) Field of Classification Search
None
See application file for complete search history.

(56) References Cited

U.S. PATENT DOCUMENTS

| | | | |
|---|---|---|---|
| 2008/0285067 A1* | 11/2008 | Rai | 358/1.15 |
| 2009/0025002 A1* | 1/2009 | Rai | 718/102 |
| 2011/0066269 A1* | 3/2011 | Zhou et al. | 700/101 |
| 2014/0240737 A1 | 8/2014 | Gross et al. | |
| 2014/0300926 A1 | 10/2014 | Rai et al. | |

* cited by examiner

*Primary Examiner* — Thomas D Lee
(74) *Attorney, Agent, or Firm* — Fox Rothschild LLP (57) ABSTRACT

A system of determining a composition of print production resources in a print shop may include a plurality of print production resources, an electronic device in communication with one or more of the print production resources, and a computer-readable storage medium in communication with the electronic device. The computer-readable storage medium may include one or more programming instructions that, when executed, cause the electronic device to identify real-time print job requests for print jobs, prioritize the clients, update a queue file based on the prioritization, identify as a highest priority client the client associated with a highest priority in the queue file, categorize the print jobs associated with the highest priority client into a large job category or a small job category, determine a composition of print production resources, route print jobs to the print production resources in the determined composition, and control operation of the print production resources.

20 Claims, 6 Drawing Sheets

PRINT JOB PRODUCTION METHODS AND SYSTEMS IN A LARGE TRANSACTION PRINT ENVIRONMENT

BACKGROUND

Large transaction operations, such as large-scale print shops, commonly experience demand spikes in volume. To handle these demand spikes, such operations usually must employ overtime and temporary labor to meet service level agreements. The current production approach involves prioritizing jobs using a policy, and then printing the jobs, staging the jobs in a staging area, gathering raw materials, and performing a quality check prior to shipping. However, this approach is costly and time-intensive.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system of determining a composition of print production resources in a print shop may include a plurality of print production resources, an electronic device in communication with one or more of the print production resources, and a computer-readable storage medium in communication with the electronic device. The computer-readable storage medium may include one or more programming instructions that, when executed, cause the electronic device to identify a plurality of real-time print job requests for print jobs that are to be completed over a period of time. Each print job may be associated with a client and a due date. The computer-readable storage medium may include one or more programming instructions that, when executed, cause the electronic device to prioritize the clients based on the due date associated with one or more associated print jobs, update a queue file based on the prioritization, identify as a highest priority client the client associated with a highest priority in the queue file, categorize each of the print jobs associated with the highest priority client into a large job category or a small job category, determine a composition of print production resources in the print shop to process the print jobs in the large job category, route the print jobs in the large job category to the print production resources in the determined composition, and control operation of the print production resources in the determined composition so that a work-in-progress level for the client does not exceed a threshold value.

In an embodiment, a system of determining a composition of print production resources in a print shop may include a plurality of print production resources, an electronic device in communication with one or more of the print production resources, and a computer-readable storage medium in communication with the electronic device. The computer-readable storage medium may include one or more programming instructions that, when executed, cause the electronic device to identify a plurality of print jobs that are to be completed over a period of time. Each print job may be associated with a client and a due date. The computer-readable storage medium may include one or more programming instructions that, when executed, cause the electronic device to prioritize the clients based on the due date associated with one or more associated print jobs, identify as a highest priority client the client associated with a highest priority, categorize each of the print jobs associated with the highest priority client into a large job category or a small job category, determine a composition of print production resources in the print shop to process the jobs in the large job category, route the print jobs in the large job category to the print production resources in the determined composition, and control operation of the print production resources in the determined composition so that a work-in-progress level for the client does not exceed a threshold value.

In an embodiment, a method of determining a composition of print production resources in a print shop may include identifying, by an electronic device, a plurality of print jobs that are to be completed over a period of time, wherein each print job is associated with a client and a due date, prioritizing, by the electronic device, the clients based on the due date associated with one or more associated print jobs, identifying as a highest priority client the client associated with a highest priority, categorizing each of the print jobs associated with the highest priority client into a large job category or a small job category, determining, by the electronic device, a composition of print production resources in the print shop to process the print jobs in the large job category, routing, by the electronic device, the print jobs in the large job category to the print production resources in the determined composition, and controlling, by the electronic device, operation of the print production resources in the determined composition so that a work-in-progress level for the client does not exceed a threshold value.

DETAILED DESCRIPTION

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

A "job" refers to a logical unit of work that is to be completed for a customer.

A "print job" refers to a job processed in a print shop. For example, a print job may include a series of processing steps for producing credit card statements corresponding to a certain credit card company, producing bank statements corresponding to a certain bank, printing a document, or the like. In this document, a print job may refer to the set of instructions that cause the items to be produced or printed, as well as the work-in-progress and produced items themselves.

A "print production resource" may be a physical device capable of processing at least a portion of a print job. Example print production resources may include black-and-white printers, color-printers, scanners, inserters, collators, binders, cutters, multi-function devices and/or the like.

A "resource" is a physical device capable of processing at least a portion of a job.

Figure 1:
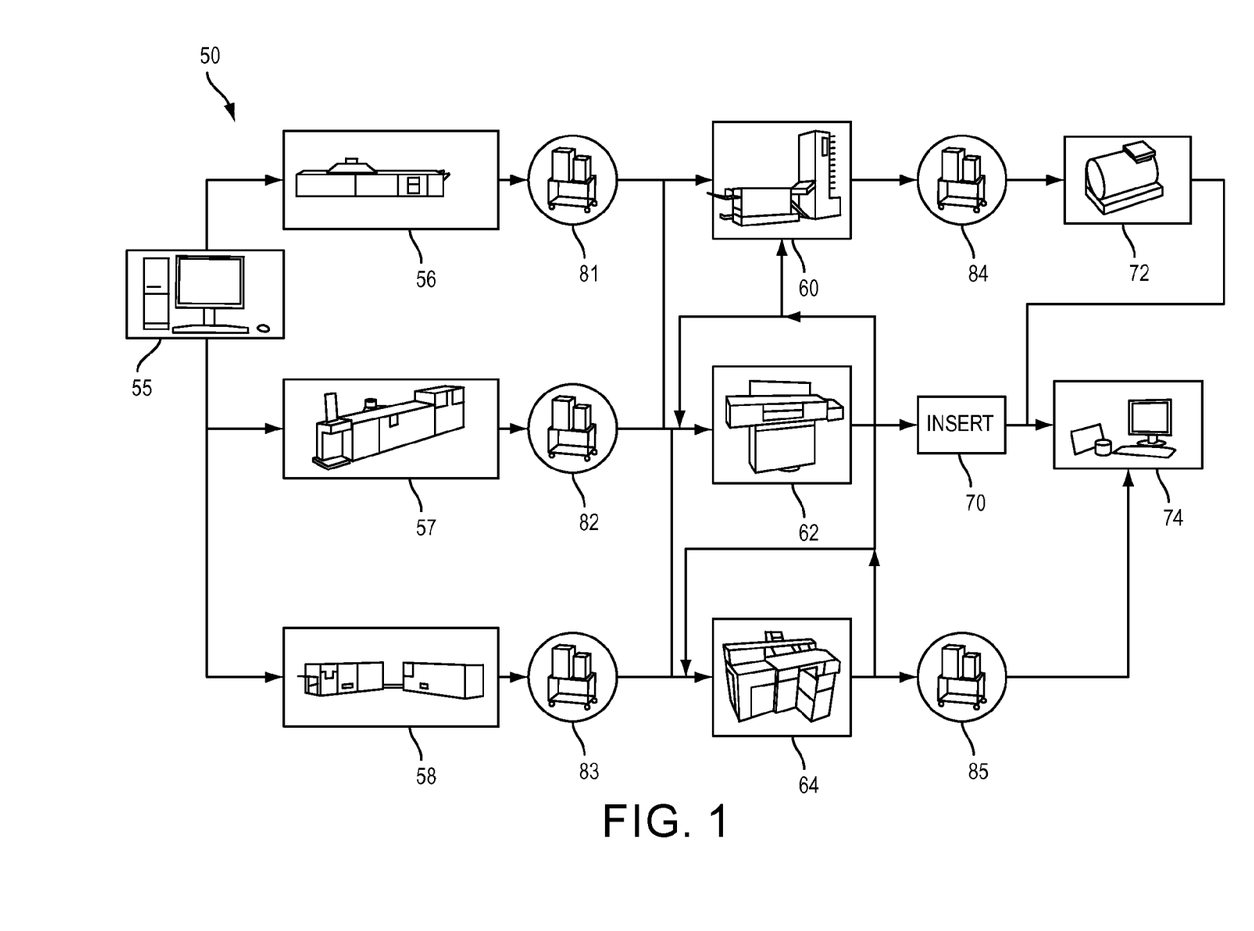
FIG. 1 shows an example of a production environment according to an embodiment.

FIG. 1 shows an example of a production environment 50, in this case, example elements of a print shop, according to an embodiment. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Figure 2:
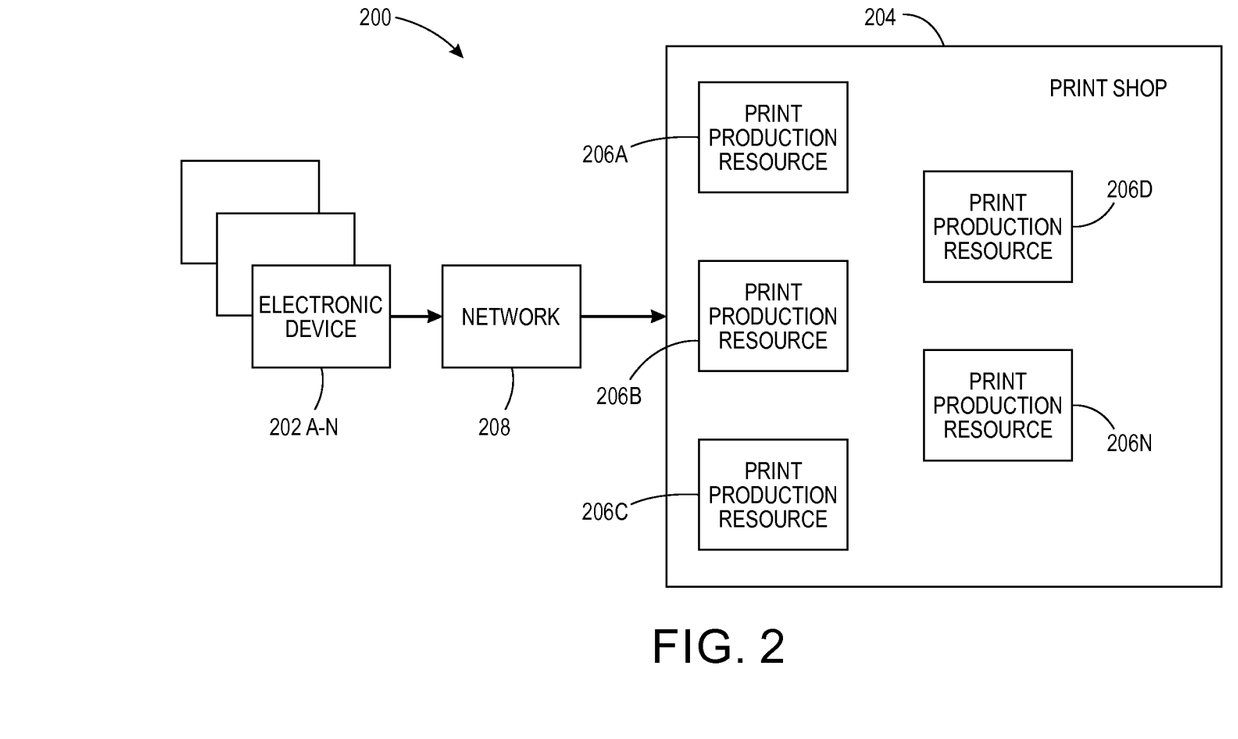
FIG. 2 illustrates an example system of processing one or more jobs according to an embodiment.

FIG. 2 illustrates an example system of processing one or more jobs according to an embodiment. As illustrated by FIG. 2, the system 200 may include one or more electronic devices 202a-N in communication with a print shop 204. The print shop may include one or more print production resources 206a-N. In various embodiments, the electronic devices 202a-N may communicate with one or more print production resources 206a-N. In certain embodiments, one or more electronic devices 202a-N may monitor and/or control the processing operations of one or more print production resources 206a-N. An electronic device 202a-N may control one or more operations of one or more print production resources 206a-N according to an embodiment. For instance, an electronic device 202a-N may cause a print production resource 206a-N to process jobs at a different processing rate, may cause a print production resource to come online, or may cause a print production resource to go offline.

In certain embodiments, a customer may engage a document production environment, such as a print shop, to process one or more jobs on its behalf. In certain embodiments, this processing may be governed by a service level agreement (SLA) between the customer and the document production environment. An SLA may include one or more measurable benchmarks relating to the processing. For instance, an SLA may specify that a certain percentage of jobs will be completed within a particular time frame. For example, an SLA may specify that a job will be completed within a certain period of time at least 95% of the time. Additional and/or alternate benchmarks may be used within the scope of this disclosure.

By way of example, a print shop may experience spikes in quarter-end job volumes. To meet its SLAs, the print shop may utilize temporary labor and pay full-time employees overtime. For instance, the print shop may have to produce approximately 5.3 million and 18 million impressions in five business days. The pay differential may be up to 1.5 times the regular hourly pay for overtime, and higher for late night shifts or weekend operations. In addition, the print shop may incur additional service costs for machine operations during these extended work hours.

Figure 3:
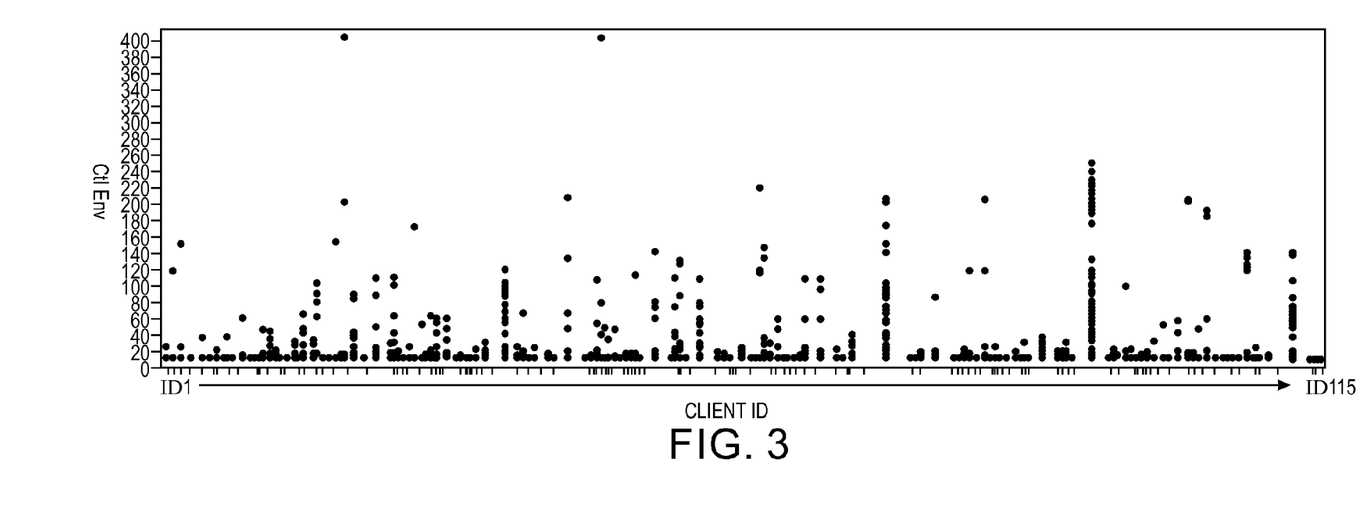
FIG. 3 illustrates the job distribution of example jobs as measured by number of envelopes according to an embodiment.

During the quarter-end run, the print shop may have printed and inserted 7,600 jobs for 266 clients, and different clients may require different pre-printed form types, different envelope types, multiple inserts and/or the like. FIG. 3 illustrates the job distribution of example jobs as measured by number of envelopes.

As illustrated by FIG. 3, the data collected on the day-to-day operation of the shop indicates significant variability in processing rates of the resources. The factors that may contribute to this variability may include, without limitation, envelope size, number of pages per envelope, operator skills, setup times, resource failures, and/or the like.

Figure 4:
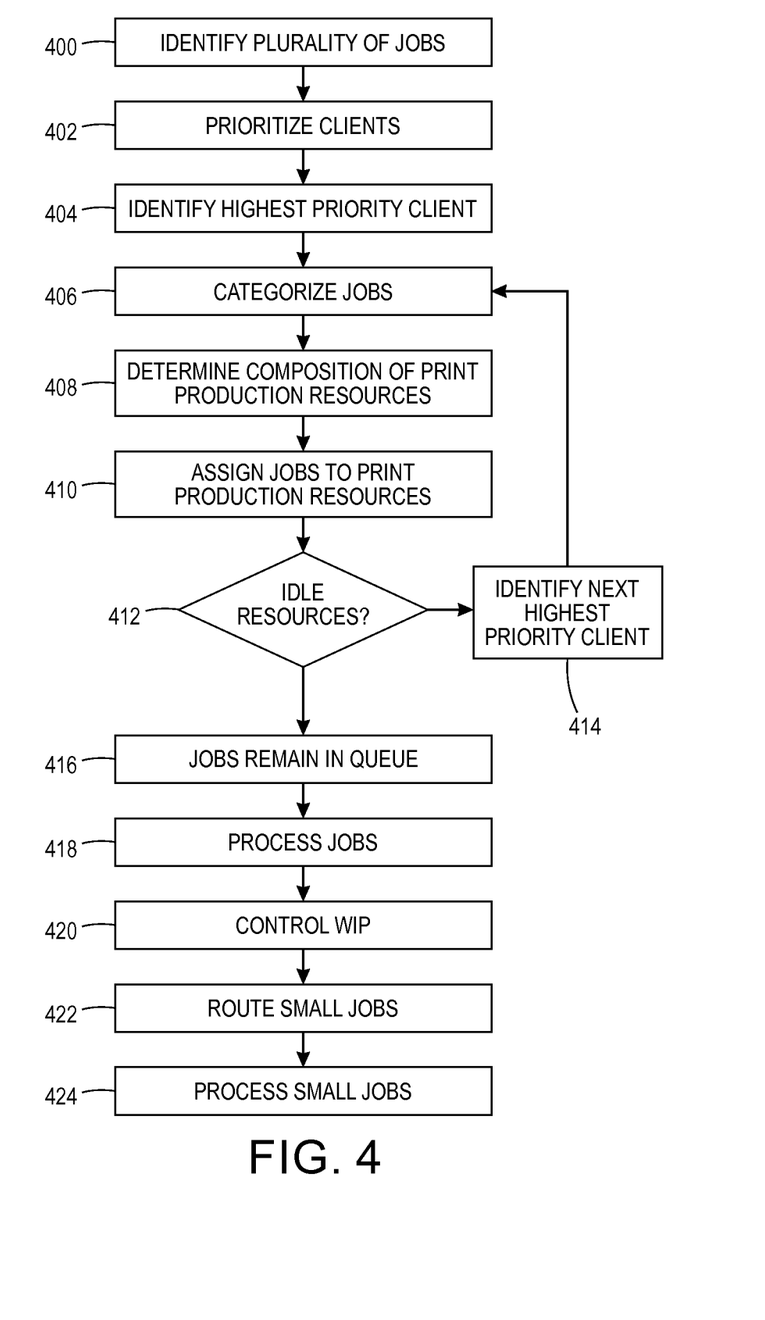
FIG. 4 illustrates an example method of processing a job according to an embodiment.

FIG. 4 illustrates an example method of processing a job according to an embodiment. As illustrated by FIG. 4, a plurality of jobs that are to be completed over a time period may be identified 400. The identified jobs may be for one or more clients or customers. In some embodiments, jobs may be identified 400 by receiving scheduling information associated with jobs that are to be processed over a time period from an electronic device or resource. In another embodiment, jobs may be identified 400 using information received by a user, such as, for example, a print shop operator or manager. In an embodiment, one or more identified jobs may correspond to one or more real-time print job requests from one or more clients or customers.

In an embodiment, the clients associated with the identified jobs may be prioritized 402 by job due date. For example, a due date corresponding to each identified job may be determined, and the corresponding clients may be prioritized 402 according to the due dates. In some embodiments, a client having a job with a due date that occurs prior to the due date of another client's job may be assigned a higher priority than the other client. Table 1 illustrates example jobs that may be identified as needing to be completed over a time period and their corresponding due dates and clients. Table 2 illustrates the jobs from Table 1 prioritized by client according to an embodiment.

TABLE 1

| Client | Job | Due Date |
| --- | --- | --- |
| Client 1 | Job 1 | Dec. 22, 2014 |
|  | Job 2 | Dec. 22, 2014 |
|  | Job 3 | Dec. 22, 2014 |
|  | Job 4 | Dec. 22, 2014 |
|  | Job 5 | Dec. 22, 2014 |
| Client 2 | Job 6 | Dec. 20, 2014 |
|  | Job 7 | Dec. 20, 2014 |
|  | Job 8 | Dec. 20, 2014 |
| Client 3 | Job 9 | Dec. 23, 2014 |
|  | Job 10 | Dec. 23, 2014 |

TABLE 2

| Client | Job | Due Date |
| --- | --- | --- |
| Client 2 | Job 6 | Dec. 20, 2014 |
| | Job 7 | Dec. 20, 2014 |
| | Job 8 | Dec. 20, 2014 |
| Client 1 | Job 1 | Dec. 22, 2014 |
| | Job 2 | Dec. 22, 2014 |
| | Job 3 | Dec. 22, 2014 |
| | Job 4 | Dec. 22, 2014 |
| | Job 5 | Dec. 22, 2014 |
| Client 3 | Job 9 | Dec. 23, 2014 |
| | Job 10 | Dec. 23, 2014 |

In some embodiments, a queue file may be updated based on the prioritization. For instance, the location or placement of one or more jobs in a queue file may be updated to reflect the prioritization. In an embodiment, the client having the highest priority jobs may be identified 404. For instance, referring to Table 2, Client 2 may be identified because its jobs have a due date that occurs before the due dates of jobs for Client 1 or Client 3.

As illustrated by FIG. 4, one or more of the jobs associated with the identified client may be categorized 406. In certain embodiments, jobs associated with a client may be categorized 406 based on size. Jobs may be categorized as large jobs or small jobs based on a comparison with a threshold value according to an embodiment. The threshold value may be a number of pages, a number of inserts, a number of impressions and/or the like. For instance, in an embodiment, a job having 200 or more impressions may be categorized as a large job, whereas a job having less than 200 impressions may be categorized as a small job. As another example, a job having 500 or pages may be categorized as a large job, whereas a job having less than 500 pages may be categorized as a small job. Additional and/or alternate thresholds and threshold values may be used within the scope of this disclosure.

In various embodiments, large jobs may be processed by one or more resources in a production environment, while small jobs may be processed by one or more other resources in the production environment. For example, a large job may be processed by roll feed printers and a small job may be printed on cut-sheet printers. Additional and/or alternate resources may be used within the scope of this disclosure.

Figure 5:
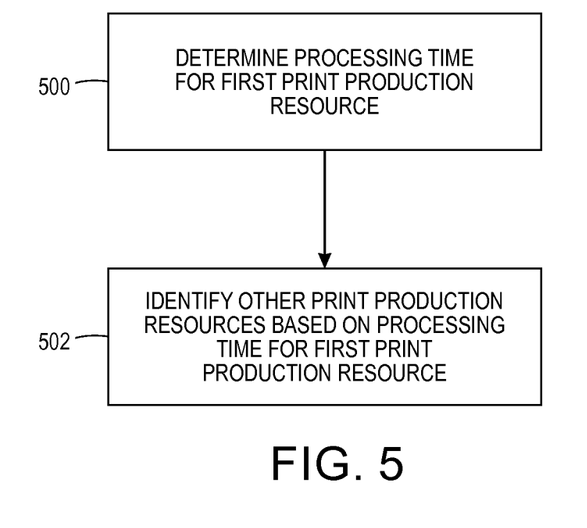
FIG. 5 illustrates an example method of determining a resource composition according to an embodiment.

In an embodiment, a composition of one or more resources may be determined 408 for one or more categories. For instance, a composition of one or more printers and inserters that substantially balance the flow of jobs may be determined 408 for the large job category. FIG. 5 illustrates an example method of determining a resource composition according to an embodiment.

As illustrated by FIG. 5, to determine 408 a composition of resources, the print time for the jobs in a category may be determined 500. In an embodiment, the print time for a job may be determined based on the job size and the processing speed of one or more printers. For example, a job may include 1,200 pages to be printed, and a printer processing speed may be 400 pages per hour. As such, the print time for this job may be 3 hours (i.e., 1,200 pages/400 pages per hour). In certain embodiments, the processing speed may be an average processing speed of one or more printers. In other embodiments, the processing speed may be an approximate processing speed value for one or more printers. Because a job page count is known and the variability in printer output and processing speed is relatively low, it is possible to determine 500 the print time for a job.

In an embodiment, one or more other resources that are to process the job may be identified 502. For instance, a job may require a printer and an inserter to completely process the job. As such, one or more inserters may be identified to process the job.

In various embodiments, one or more other resources may be identified 502 based on the determined print time. For example, one or more other resources that are able to process the job in substantially the same amount of time as the determined print time may be identified. For instance, a job may require printing and inserting. The print time for the job may be determined 500 to be 20 hours. One or more inserters that can process the job in as close as possible to 20 hours may be identified 502. For instance, an estimated processing time for one or more available inserters may be determined, and the inserter(s) having the processing time closest to 20 hours may be identified 502.

In other embodiments, one or more different resource combinations may be evaluated. For instance, the print time for a job to be printed by a single printer may be 20 hours. But the print time for the job to be printed by two printers may be 10 hours. As such, one or more inserters having the processing time closest to 10 hours may be identified 502. Additional and/or alternate combinations may be used within the scope of this disclosure.

Referring back to FIG. 4, the jobs may be assigned 410 to the determined composition of resources. In an embodiment, a job may be assigned 410 to a determined composition of resources in response to receiving one or more status communications from one or more resources. For instance, a resource may generate and send a communication to one or more electronic devices that it is ready or available to process one or more jobs. In some embodiments, a resource may generate and send a status communication in response to receiving a request from an electronic device.

It may be determined 412 whether there are any idle resources that have not been assigned. In an embodiment, an idle resource may be a resource to which a job has not been assigned or a resource that is not processing any job. For instance, referring to the above example, it may be determined 412 whether there are any idle printers that have not been assigned. In some embodiments, determining whether there are any idle resources that have not been assigned may be based, at least in part, on a status communication received from one or more resources. For instance, a status communication from a resource may indicate that the resource is currently idle.

If it is determined that there are available printers that have not been assigned, the client having the next highest priority may be identified 414, and the process described above with respect to steps 406-412 may be repeated for the jobs of the client with the next highest priority and the available resources. If it is determined that there are no available resources that have not been assigned, the jobs that have not yet been assigned may remain 416 in a queue to be processed.

As illustrated by FIG. 4, the jobs may be processed 418 by the assigned resources. The system may monitor the work in progress (WIP) associated with one or more jobs and/or clients. For example, the system may control the WIP associated with one or more clients to satisfy a certain threshold value. For instance, the system may control the WIP associated with a client so that it does not exceed a certain threshold value.

In certain embodiments, the system may control 420 the WIP for a particular job and/or client. The system may control 420 the WIP of one or more jobs or clients by changing the configuration of the resources processing the applicable jobs. Changing the configuration or resources may include, for example, altering a processing speed of one or more resources, adding one or more resources, bringing one or more resources online, removing one or more resources, taking one or more resources offline, and/or the like.

For instance, insertion production may be slower than anticipated. If this is the case, the WIP for a certain client may accumulate, and upstream printing may be slowed by, for example, reducing the number of printers printing the job. As another example, the downstream insertion lines may be pre-empted from processing other jobs having a lower WIP in order to consume the already-existing WIP. As yet another example, upstream printing may be slowed and downstream insertion lines may be pre-empted from processing other jobs having a lower WIP.

In certain embodiments, jobs categorized as small jobs may be routed 422 to one or more different resources than jobs that are categorized as large jobs. For example, jobs in the small job category may be routed 422 to slower resources or manual operators depending on the job requirements. As such, smaller jobs may be routed 422 to another flow path so they do not consume capacity on high-speed resources. Small jobs may then be processed 424 by the resources to which they are routed 422.

Figure 6:
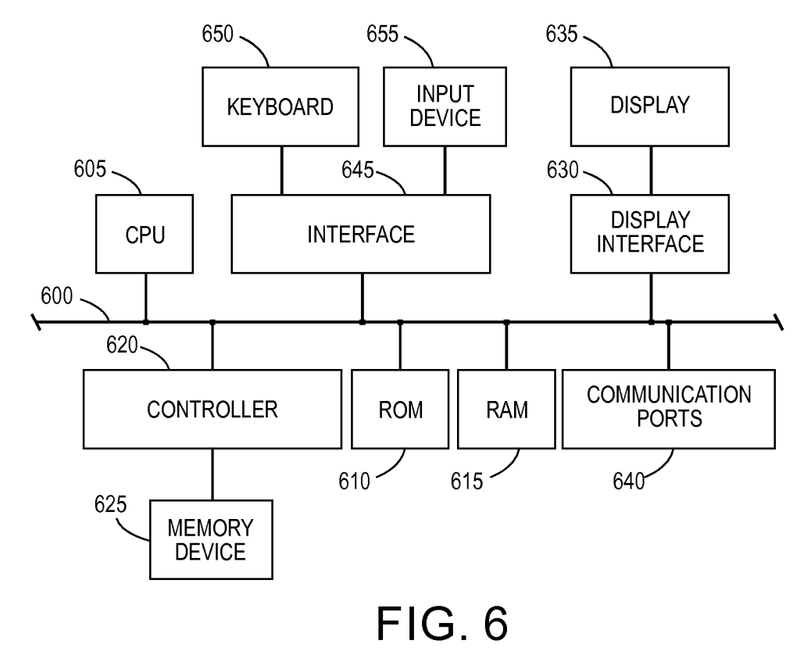
FIG. 6 illustrates a block diagram of example hardware that may be used to contain or implement program instructions according to an embodiment.

FIG. 6 depicts a block diagram of hardware that may be used to contain or implement program instructions. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an example of a production device, computing device or processor as such terms are used within this disclosure. Read only memory (ROM) 610 and random access memory (RAM) 615 constitute examples of non-transitory computer-readable storage media.

A controller 620 interfaces with one or more optional non-transitory computer-readable storage media 625 to the system bus 600. These storage media 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible, non-transitory computer-readable medium such as a compact disk, a digital disk, flash memory, a memory card, a USB drive, an optical disc storage medium and/or other recording medium.

An optional display interface 630 may permit information from the bus 600 to be displayed on the display 635 in audio, visual, graphic or alphanumeric format. Communication with external devices, such as a printing device, may occur using various communication ports 640. A communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A system of determining a composition of print production resources in a print shop, the system comprising:
   a plurality of print production resources;
   an electronic device in communication with one or more of the print production resources; and
   a computer-readable storage medium in communication with the electronic device, wherein the computer-readable storage medium comprises one or more programming instructions that, when executed, cause the electronic device to:
      identify a plurality of real-time print job requests for print jobs that are to be completed over a period of time, wherein each print job is associated with a client and a due date,
      prioritize the clients based on the due date associated with one or more associated print jobs,
      update a queue file based on the prioritization,
      identify as a highest priority client the client associated with a highest priority in the queue file,
      categorize each of the print jobs associated with the highest priority client into a large job category or a small job category,
      determine a composition of print production resources in the print shop to process the jobs in the large job category,
      route the print jobs in the large job category to the print production resources in the determined composition, and
      control operation of the print production resources in the determined composition so that a work-in-progress level for the client does not exceed a threshold value.

2. The system of claim 1, wherein the one or more programming instructions that, when executed, cause the electronic device to determine a composition of print production resources to process the jobs in the large job category comprise one or more programming instructions that, when executed, cause the electronic device to:
   determine a processing time associated with a first print production resource in the composition; and
   identify one or more other print production resources in the composition by determining which of the other print production resources are capable of processing the print job within the processing time associated with the first print production resource.

3. The system of claim 1, wherein the one or more programming instructions that, when executed, cause the electronic device to determine a composition of print production resources to process the jobs in the large job category comprise one or more programming instructions that, when executed, cause the electronic device to:
   determine a print time associated with a printer in the composition; and
   identify one or more inserters in the composition by determining which inserters are capable of processing the print job within the print time.

4. The system of claim 1, wherein the one or more programming instructions that, when executed, cause the electronic device to control operation of the print production resources comprise one or more programming instructions that, when executed, cause the electronic device to perform one or more of the following:
   alter a processing speed of one or more print production resources in the configuration;

add a new print production resource to the configuration; and remove a new print production resource to the configuration.

5. The system of claim 1, wherein the one or more programming instructions that, when executed, cause the electronic device to control operation of the print production resources comprise one or more programming instructions that, when executed, cause the electronic device to preempt a downstream print production resource from processing print jobs having a work-in-progress level that is less than the work-in-progress level for the client.

6. The system of claim 1, wherein the computer-readable storage medium further comprises one or more programming instructions that, when executed, cause the electronic device to:
   determine whether one or more print production resources in the print shop are idle; and
   in response to determining that one or more print production resources in the print shop are idle:
      categorizing each of the jobs associated with a next highest priority client into a second large job category or a second small job category,
      determining, by the electronic device, a second composition of print production resources in the print shop to process the jobs in the second large job category, wherein the second composition comprises one or more of the idle print production resources;
      routing, by the electronic device, the jobs in the second large job category to the print production resources in the second determined composition; and
      controlling, by the electronic device, operation of the print production resources in the determined second composition so that a work-in-progress level for the next highest priority client does not exceed a second threshold value.

7. The system of claim 1, wherein the computer-readable storage medium further comprises one or more programming instructions that, when executed, cause the electronic device to route the jobs in the small job category to one or more print production resources in the print shop that are not included in the determined composition.

8. A system of determining a composition of print production resources in a print shop, the system comprising:
   a plurality of print production resources;
   an electronic device in communication with one or more of the print production resources; and
   a computer-readable storage medium in communication with the electronic device, wherein the computer-readable storage medium comprises one or more programming instructions that, when executed, cause the electronic device to:
      identify a plurality of print jobs that are to be completed over a period of time, wherein each print job is associated with a client and a due date,
      prioritize the clients based on the due date associated with one or more associated print jobs,
      identify as a highest priority client the client associated with a highest priority,
      categorize each of the print jobs associated with the highest priority client into a large job category or a small job category,
      determine a composition of print production resources in the print shop to process the print jobs in the large job category,
      route the print jobs in the large job category to the print production resources in the determined composition, and
      control operation of the print production resources in the determined composition so that a work-in-progress level for the client does not exceed a threshold value.

9. The system of claim 8, wherein the one or more programming instructions that, when executed, cause the electronic device to categorize each of the jobs associated with the highest priority client into a large job category or a small job category comprise one or more programming instructions that, when executed, cause the electronic device to, for each job associated with the highest priority client:
   determine a size associated with the job;
   categorize the job into the large job category if the size associated with the job exceeds a size threshold value; and
   categorize the job into the small job category if the size associated with the job does not exceed the size threshold value.

10. The system of claim 8, wherein the one or more programming instructions that, when executed, cause the electronic device to determine a composition of print production resources to process the jobs in the large job category comprise one or more programming instructions that, when executed, cause the electronic device to:
   determine a processing time associated with a first print production resource in the composition; and
   identify one or more other print production resources in the composition by determining which of the other print production resources are capable of processing the print job within the processing time associated with the first print production resource.

11. The system of claim 8, wherein the one or more programming instructions that, when executed, cause the electronic device to determine a composition of print production resources to process the jobs in the large job category comprise one or more programming instructions that, when executed, cause the electronic device to:
   determine a print time associated with a printer in the composition; and
   identify one or more inserters in the composition by determining which inserters are capable of processing the print job within the print time.

12. The system of claim 8, wherein the one or more programming instructions that, when executed, cause the electronic device to control operation of the print production resources comprise one or more programming instructions that, when executed, cause the electronic device to perform one or more of the following:
   alter a processing speed of one or more print production resources in the configuration;
   add a new print production resource to the configuration;
   remove a new print production resource to the configuration; and
   cause the electronic device to preempt a downstream print production resource from processing print jobs having a work-in-progress level that is less than the work-in-progress level for the client.

13. The system of claim 8, wherein the computer-readable storage medium further comprises one or more programming instructions that, when executed, cause the electronic device to:
   determine whether one or more print production resources in the print shop are idle; and
   in response to determining that one or more print production resources in the print shop are idle:

categorizing each of the jobs associated with a next highest priority client into a second large job category or a second small job category;

determining, by the electronic device, a second composition of print production resources in the print shop to process the jobs in the second large job category, wherein the second composition comprises one or more of the idle print production resources;

routing, by the electronic device, the jobs in the second large job category to the print production resources in the second determined composition; and controlling, by the electronic device, operation of the print production resources in the determined second composition so that a work-in-progress level for the next highest priority client does not exceed a second threshold value.

14. A method of determining a composition of print production resources in a print shop, the method comprising:

identifying, by an electronic device, a plurality of print jobs that are to be completed over a period of time, wherein each print job is associated with a client and a due date;

prioritizing, by the electronic device, the clients based on the due date associated with one or more associated print jobs;

identifying as a highest priority client the client associated with a highest priority;

categorizing each of the print jobs associated with the highest priority client into a large job category or a small job category;

determining, by the electronic device, a composition of print production resources in the print shop to process the print jobs in the large job category;

routing, by the electronic device, the print jobs in the large job category to the print production resources in the determined composition; and controlling, by the electronic device, operation of the print production resources in the determined composition so that a work-in-progress level for the client does not exceed a threshold value.

15. The method of claim 14, wherein categorizing each of the jobs associated with the highest priority client into a large job category or a small job category comprises, for each job associated with the highest priority client:

determining a size associated with the job;

categorizing the job into the large job category if the size associated with the job exceeds a size threshold value; and categorizing the job into the small job category if the size associated with the job does not exceed the size threshold value.

16. The method of claim 14, wherein determining a composition of print production resources to process the jobs in the large job category comprises:

determining a processing time associated with a first print production resource in the composition; and identifying one or more other print production resources in the composition by determining which of the other print production resources are capable of processing the print job within the processing time associated with the first print production resource.

17. The method of claim 14, wherein determining a composition of print production resources to process the jobs in the large job category comprises:

determining a print time associated with a printer in the composition; and identifying one or more inserters in the composition by determining which inserters are capable of processing the print job within the print time.

18. The method of claim 14, wherein controlling operation of the print production resources comprises performing one or more of the following:

altering a processing speed of one or more print production resources in the configuration;

adding a new print production resource to the configuration; and removing a new print production resource to the configuration.

19. The method of claim 14, wherein controlling operation of the print production resources comprises preempting a downstream print production resource from processing print jobs having a work-in-progress level that is less than the work-in-progress level for the client.

20. The method of claim 14, further comprising:

determining whether one or more print production resources in the print shop are idle;

in response to determining that one or more print production resources in the print shop are idle:

categorizing each of the jobs associated with a next highest priority client into a second large job category or a second small job category, determining, by the electronic device, a second composition of print production resources in the print shop to process the jobs in the second large job category, wherein the second composition comprises one or more of the idle print production resources, routing, by the electronic device, the jobs in the second large job category to the print production resources in the second determined composition, and controlling, by the electronic device, operation of the print production resources in the determined second composition so that a work-in-progress level for the next highest priority client does not exceed a second threshold value.

* * * * *